(12) United States Patent
Huang et al.

(10) Patent No.: US 11,828,606 B2
(45) Date of Patent: Nov. 28, 2023

(54) METHOD AND APPARATUS FOR UPDATING POINT CLOUD

(71) Applicant: BEIJING BAIDU NETCOM SCIENCE AND TECHNOLOGY CO., LTD., Beijing (CN)

(72) Inventors: Jie Huang, Beijing (CN); Yu Liu, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 256 days.

(21) Appl. No.: 17/214,464

(22) Filed: Mar. 26, 2021

(65) Prior Publication Data
US 2021/0223048 A1    Jul. 22, 2021

(30) Foreign Application Priority Data
Apr. 29, 2020   (CN) .......................... 202010356301.3

(51) Int. Cl.
*G01C 21/32*    (2006.01)
*G06T 7/11*    (2017.01)
(Continued)

(52) U.S. Cl.
CPC .............. *G01C 21/32* (2013.01); *G06T 5/002* (2013.01); *G06T 5/50* (2013.01); *G06T 7/11* (2017.01);
(Continued)

(58) Field of Classification Search
CPC ..... G01C 21/32; G01C 21/3811; G06T 5/002; G06T 5/50; G06T 7/11;
(Continued)

(56) References Cited

U.S. PATENT DOCUMENTS

| 9,918,204 | B1 | 3/2018 | Côté et al. |
| 2018/0158200 | A1* | 6/2018 | Metzler ................. G01C 15/00 |

(Continued)

FOREIGN PATENT DOCUMENTS

| CN | 105550688 A | 5/2016 |
| CN | 106688017 A | 5/2017 |

(Continued)

OTHER PUBLICATIONS

Machine Translation: WO-2018221455-A1 (Year: 2018).*
(Continued)

*Primary Examiner* — Anne Marie Antonucci
*Assistant Examiner* — Connor L Knight
(74) *Attorney, Agent, or Firm* — Kilpatrick Townsend & Stockton LLP

(57) ABSTRACT

A method and apparatus for updating a point cloud. The method may include: determining an area point cloud matching newly added point clouds from historical point clouds to be updated based on a set formed by a pose of a point cloud acquisition device acquiring the newly added point clouds. The method may further include: merging the newly added point clouds into the matched area point cloud to obtain merged historical point clouds. The method may further include: performing global optimization on the merged historical point clouds based on a pose of each point cloud in the merged historical point clouds to obtain updated point clouds.

6 Claims, 6 Drawing Sheets

(51) Int. Cl.
  *G06T 5/00* (2006.01)
  *G06T 5/50* (2006.01)
  *G06K 9/00* (2022.01)
  *G06V 20/56* (2022.01)

(52) U.S. Cl.
  CPC .... *G06V 20/56* (2022.01); *G06T 2207/10028* (2013.01); *G06T 2207/20221* (2013.01)

(58) Field of Classification Search
  CPC . G06T 2207/10028; G06T 2207/20221; G06T 7/33; G06T 3/4038; G06V 20/56; G01S 17/42; G01S 17/89; G01S 17/931
  See application file for complete search history.

(56) References Cited

U.S. PATENT DOCUMENTS

| | | | |
|---|---|---|---|
| 2018/0217663 | A1 | 8/2018 | Chandrasekhar et al. |
| 2019/0171212 | A1 | 6/2019 | Wang et al. |
| 2019/0205665 | A1 | 7/2019 | Duan et al. |
| 2019/0271780 | A1* | 9/2019 | Bravo Orellana ...... G01S 17/87 |
| 2019/0378296 | A1 | 12/2019 | Zheng et al. |

FOREIGN PATENT DOCUMENTS

| | | | |
|---|---|---|---|
| CN | 107160395 | A | 9/2017 |
| CN | 107796397 | A | 3/2018 |
| CN | 108268481 | A * | 7/2018 |
| CN | 108648240 | A * | 10/2018 |
| CN | 108732584 | A | 11/2018 |
| CN | 108765487 | A | 11/2018 |
| CN | 109061703 | A | 12/2018 |
| CN | 109493375 | A * | 3/2019 |
| CN | 109635052 | A | 4/2019 |
| CN | 109655072 | A | 4/2019 |
| CN | 110189400 | A * | 8/2019 |
| CN | 110400363 | A | 11/2019 |
| CN | 110411464 | A | 11/2019 |
| CN | 110561423 | A | 12/2019 |
| CN | 110832275 | A | 2/2020 |
| CN | 110859043 | A | 3/2020 |
| EP | 2 990 828 | A1 | 3/2016 |
| EP | 3 324 209 | A1 | 5/2018 |
| JP | 2016-045825 | A | 4/2016 |
| JP | 2017-010393 | A | 1/2017 |
| JP | 2019-504800 | A | 2/2019 |
| KR | 102006148 | B1 * | 8/2019 |
| TW | 202001924 | A | 1/2020 |
| WO | 2017/220714 | A1 | 12/2017 |
| WO | 2018/119889 | A1 | 7/2018 |
| WO | WO-2018221455 | A1 * | 12/2018 |
| WO | 2020/058735 | A1 | 3/2020 |

OTHER PUBLICATIONS

Machine Translation: CN-110189400-A (Year: 2019).*
Machine Translation: CN-109493375-A (Year: 2019).*
Machine Translation: CN-108648240-A (Year: 2018).*
Machine Translation: CN-108268481-A (Year: 2018).*
Machine Translation: KR-102006148-B1 (Year: 2019).*
European Search Report dated Nov. 8, 2021 of corresponding European Patent Application No. 21165854.7 (ten pages).
Tang, Jie et al., "Edge High-Precise Map Services for Autonomous Driving," South China University of Technology, Shenzhen PerceptIn Technology Co., Ltd., vol. 25, No. 3, pp. 58-61 (Jun. 2019).
Lee, Hojoon et al., "Moving Object Detection and Tracking Based on Interaction of Static Obstacle Map and Geometric Model-Free Approach for Urban Autonomous Driving," IEEE Transactions on Intelligent Transportation Systems, pp. 1-10, (2020).

* cited by examiner

METHOD AND APPARATUS FOR UPDATING POINT CLOUD

CROSS-REFERENCE TO RELATED APPLICATIONS

This application claims priority to Chinese Patent Application No. 202010356301.3, filed on Apr. 29, 2020, titled "Method and apparatus for updating point cloud," which is hereby incorporated by reference in its entirety.

TECHNICAL FIELD

Embodiments of the present disclosure disclose a method and apparatus for updating a point cloud, and relate to the field of autonomous driving.

BACKGROUND

A high-precision map, also referred to as a HD Map (High Definition Map), is a map specially serving for autonomous driving. Unlike the conventional navigation map, the high-precision map may provide lane-level navigation information in addition to providing road-level navigation information. The richness of the information and the accuracy of the information are much higher than those of the conventional navigation map.

SUMMARY

Embodiments of the disclosure provide a method and apparatus for updating a point cloud, a device, and a storage medium.

According to a first aspect, an embodiment of the disclosure provides a method for updating a point cloud, including: determining an area point cloud matching newly added point clouds from historical point clouds to be updated based on a set formed by a pose of a point cloud acquisition device acquiring the newly added point clouds; merging the newly added point clouds into the matched area point cloud to obtain merged historical point clouds; and performing global optimization on the merged historical point clouds based on a pose of each point cloud in the merged historical point clouds to obtain updated point clouds.

According to a second aspect, an embodiment of the disclosure provides an apparatus for updating a point cloud, including: an area determining module configured to determine an area point cloud matching newly added point clouds from historical point clouds to be updated based on a set formed by a pose of a point cloud acquisition device acquiring the newly added point clouds; point cloud merging module configured to merge the newly added point clouds into the matched area point cloud to obtain merged historical point clouds; and a pose optimizing module configured to perform global optimization on the merged historical point clouds based on a pose of each point cloud in the merged historical point clouds to obtain updated point clouds.

According to a third aspect, an embodiment of the disclosure provides an electronic device, including: at least one processor; and a memory communicatively connected with the at least one processor. The memory stores instructions executable by the at least one processor, the instructions, when executed by the at least one processor, cause the at least one processor to perform the method for updating a point cloud.

According to a fourth aspect, an embodiment of the disclosure provides a non-transitory computer-readable storage medium storing computer instructions. The computer instructions are used to cause a computer to perform the method for updating a point cloud.

It should be understood that the description in this section is not intended to identify key or critical features of the embodiments of the disclosure, nor is it intended to limit the scope of the disclosure. Other features of the present disclosure will become readily apparent from the following description.

BRIEF DESCRIPTION OF THE DRAWINGS

The drawings are intended to provide a better understanding of the present disclosure and are not to be construed as limiting the disclosure.

DETAILED DESCRIPTION

Example embodiments of the present disclosure are described below in combination with accompanying drawings, and various details of embodiments of the present disclosure are included in the description to facilitate understanding, and should be considered as an example. Accordingly, it should be recognized by one of ordinary skill in the art that various changes and modifications may be made to the embodiments described herein without departing from the scope and spirit of the present disclosure. Also, for clarity and conciseness, descriptions for well-known functions and structures are omitted in the following description.

Figure 1:
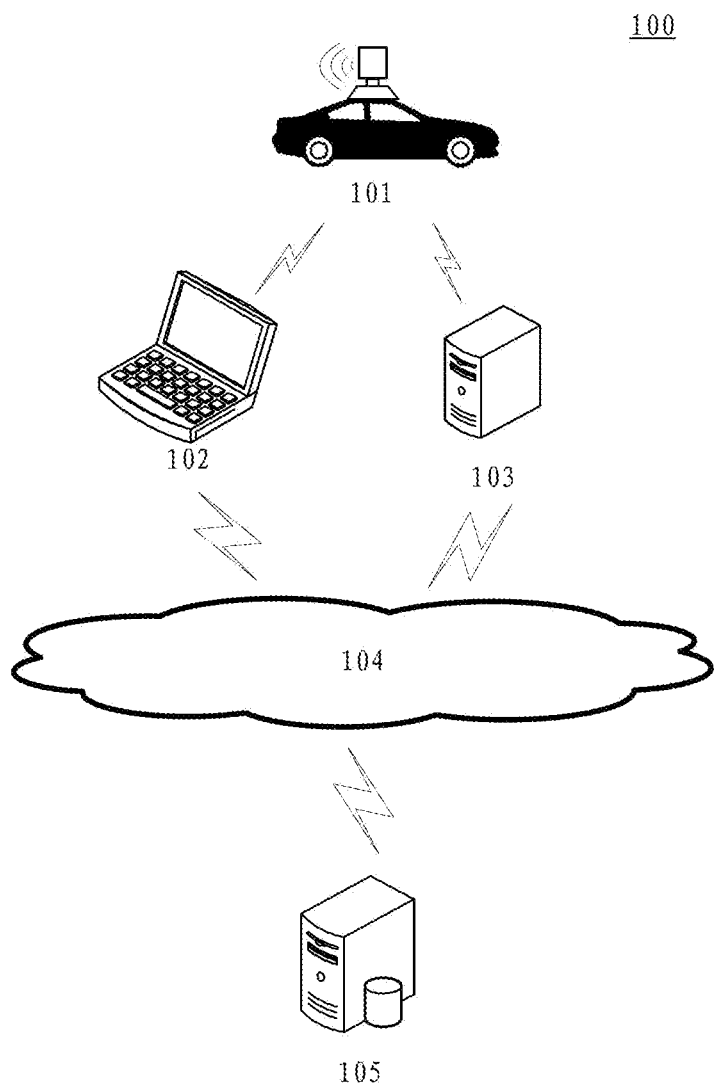
FIG. 1 is an example system architecture diagram in which embodiments of the present disclosure may be applied.

FIG. 1 illustrates an example system architecture 100 of a method for updating a point cloud or an apparatus for updating a point cloud to which embodiments of the present disclosure may be applied.

As shown in FIG. 1, the system architecture 100 may include a point cloud acquisition device 101, terminal devices 102 and 103, a network 104, and a server 105. The network 104 serves as a medium for providing a communication link between the terminal devices 102 and 103 and the server 105. Network 104 may include various types of connections, such as wired, wireless communication links, or fiber optic cables, and the like.

The terminal devices 102, and 103 may be hardware or software. When the terminal devices 102, and 103 are hardware, they may be various electronic devices having a data interaction function with a server, including but not limited to a smartphone, a tablet computer, a desktop computer, and the like. When the terminal devices 102 and 103 are software, they may be installed in the electronic devices listed above, and may be implemented, for example, as a plurality of software programs or software modules for providing distributed services, or as a single software program or software module, which is not specifically limited herein.

The acquisition device 101 (which may be, for example, a vehicle equipped with a point cloud acquisition device such as a laser radar or a camera) may transmit the acquired point clouds to the terminal devices 102 and 103, and then perform processing on the terminal devices (for example, newly added point clouds may be obtained by combining the point clouds of a plurality of batches whose acquisition times are similar). The user may then use the terminal devices 102 and 103 to interact with the server 105 through the network 104 to send data, for example, to send the newly added point clouds acquired by the point cloud acquisition device to the server 105, so that the server 105 updates the historical point clouds; Alternatively, the updated point clouds obtained after the terminal device performs the method for updating the point clouds is transmitted to the server 105.

The server 105 may be a server providing a data processing service, for example, a background data server for updating the history point clouds based on newly added point clouds uploaded by the terminal devices 102 and 103; or a server receiving the updated point clouds for subsequent data processing.

At this time, the method for updating a point cloud provided by embodiments of the present disclosure may be executed by the server 105, and accordingly, the apparatus for updating a point cloud may be provided in the server 105. At this time, the terminal device may transmit the newly added point clouds to the server 105 through the network, and the server 105 updates the history point clouds based on the newly added point clouds.

It should be noted that the method for updating a point cloud provided by embodiment of the present disclosure may alternatively be executed by the terminal device, such as a desktop computer, and accordingly, the apparatus for updating a point cloud may be provided in the terminal device. For example, the terminal device may acquire the newly added point clouds from the acquisition device 101, and then update the historical point clouds based on the newly added point clouds, which is not limited herein.

Figure 2:
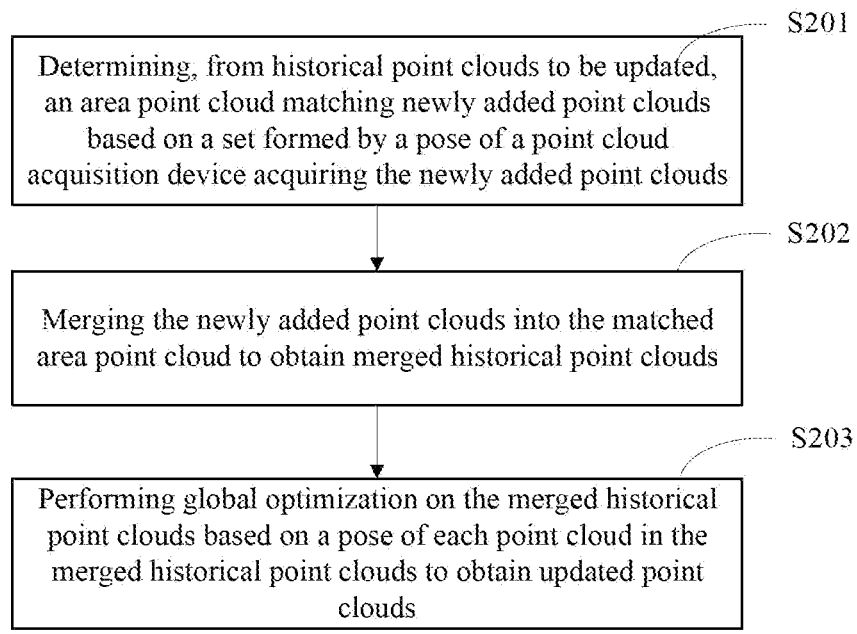
FIG. 2 is a schematic diagram according to a first embodiment of the present disclosure.

With continuing reference to FIG. 2, there is shown a flow chart of a method for updating a point cloud according to a first embodiment of the present disclosure, which includes the following steps.

Step S201: determining, from historical point clouds to be updated, an area point cloud matching newly added point clouds based on a set formed by a pose of a point cloud acquisition device acquiring the newly added point clouds.

In this embodiment, the pose of the point cloud acquisition device refers to absolute coordinates of the point cloud acquisition device (e.g., GPS (Global Positioning System) coordinates) and a posture of the point cloud acquisition device (e.g., camera external parameters, including a rotation matrix and a translation matrix) when the point cloud is acquired. The absolute coordinates of the point cloud may be obtained by coordinate conversion by combining the point cloud coordinates of the point cloud in the acquired image and the pose of the point cloud acquisition device.

In the present embodiment, the newly added point clouds are point clouds acquired by a point cloud acquisition device (such as an acquisition vehicle equipped with a LIDAR (Light Detection and Ranging)), and have not been applied to the map construction. The newly added point clouds are used to update existing point clouds, thereby realizing updating of a constructed map. The historical point clouds may be point clouds which form a map after a series of map construction steps such as splicing, registration, labeling and the like.

As an example, history point clouds and a map constructed based on the history point clouds are stored in the executing body, and the executing body may divide the map into a plurality of areas according to the coverage of the map, and then divide the history point clouds into a plurality of areas according to the partition result of the map accordingly. For example, the coverage area of the map corresponding to the historical point clouds is Beijing, and the map may be divided into different areas according to the administrative regions, such as Chaoyang District and Haidian District. It is understood that the division of the map is consistent with the division of the historical point clouds, and therefore the historical point clouds may be divided into a plurality of corresponding areas according to the division result of the map, such as the area point cloud corresponding to the map area of the Chaoyang District and the area point cloud corresponding to the map area of the Haidian District. In this way, it is possible to determine a map area through which the point cloud acquisition device acquires the newly added point cloud according to the pose of the point cloud acquisition device, and the area point cloud in the historical point clouds corresponding to the map area is the area point cloud matching the newly added point cloud.

In some alternative implementations of the present embodiment, the area point cloud data of the historical data may also be obtained by dividing the historical point clouds into areas corresponding to the absolute coordinates of the historical point clouds based on the absolute coordinates of the historical point clouds.

It will be understood that the absolute coordinates of the point cloud are used to characterize the position of the point in the real world. Taking an example by combining an application scenario, the actual area covered by each area in the map may be set to be a square area with a side length of 1 km, and then the area covered by the map is divided into several areas of the same size according to longitude and latitude, and then the division result is mapped to the historical point clouds, so that the historical point clouds may be divided into the equal number of areas. Thus, the area to which the point cloud belongs may be determined only according to the absolute coordinates of the point cloud.

In a specific example of the present implementation, the executing body may determine, from the historical point clouds, an area in which an acquisition behavior exists according to the absolute coordinates of the point cloud acquisition device, and the point clouds in the area are the area point cloud matching the newly added point clouds.

Step S202: merging the newly added point clouds into the matched area point cloud to obtain merged historical point clouds.

In the present embodiment, merging the newly added point clouds to the matched area point clouds refers to that using the newly added point clouds and the matched area point cloud as to be spliced objects, and merging them using a point cloud matching algorithm. It should be noted that, in the merging process, the newly added point clouds and the matched area point cloud are involved in the merging operation of the point clouds, rather than the newly added point clouds and the entire historical point clouds.

As an example, after executing step S201, the executing body determines three area point clouds, namely, area point cloud A, area point cloud B, and area point cloud C, that match the newly added point clouds. Accordingly, the newly added point clouds may be divided into three parts: newly added area point cloud 1, newly added area point cloud 2, and newly added area point cloud 3. The area point cloud A and the newly added area point cloud 1, the area point cloud B and the newly added area point cloud 2, and the area point cloud C and the newly added area point cloud 3 are taken as to be spliced objects, and the merging of the three groups of to be spliced objects is realized by using the point cloud matching algorithm, that is, the newly added point clouds are merged into the matched area point clouds to obtain the merged historical point clouds.

It should be noted that the point cloud matching algorithm belongs to a mature algorithm in the field of visual maps. For example, an ICP algorithm (Iterative Closest Point) or an NDT algorithm (Normal Distributions Transform) may be used to implement the above-mentioned point cloud merging step, which is not limited in embodiments of the present disclosure.

Step S203: performing global optimization on the merged historical point clouds based on a pose of each point cloud in the merged historical point clouds to obtain updated point clouds.

In the present embodiment, when the newly added point clouds are merged into the historical point clouds in step S202, the newly added point clouds and respective area point clouds are involved in the stitching operation. Therefore, the obtained merged historical point clouds may have an uneven boundary alignment between respective area region point clouds. Therefore, the merged historical point clouds need to be globally optimized to eliminate the boundary error.

As an example, the executing body may use the BA (Bundle Adjustment) algorithm to perform global optimization on the merged historical point clouds based on the pose of each point cloud in the merged historical point clouds.

Figure 3:
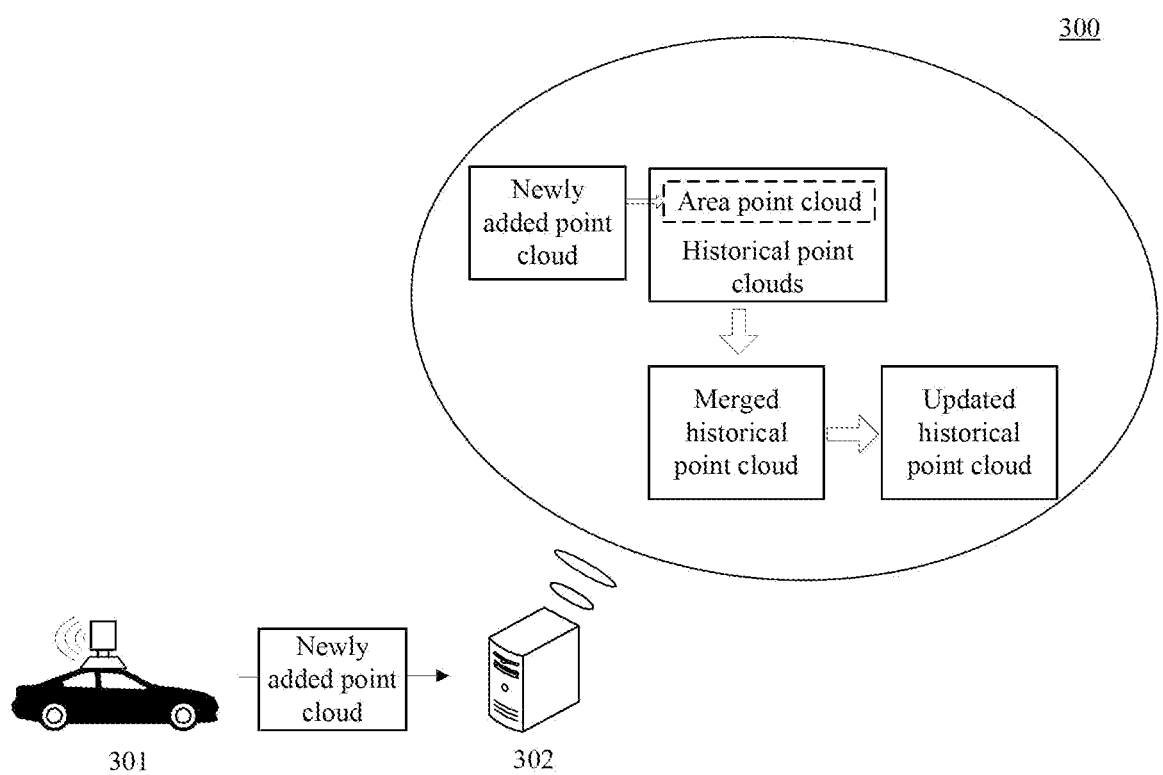
FIG. 3 is a schematic diagram of a scenario of a method for updating a point cloud according to an embodiment of the present disclosure.

Next, referring to FIG. 3, FIG. 3 shows a schematic diagram of a scenario 300 of a method for updating a point cloud according to an embodiment of the present disclosure. In the scenario 300 of FIG. 3, an acquisition vehicle 301 acquires point clouds of a target area through a point cloud acquisition device (which may be, for example, a lidar or a binocular camera) as newly added point clouds for updating history point clouds, and then sends the newly added points cloud to the executing body 302, and the executing body 302 merges the newly added point clouds into a matched area point cloud in the history point clouds to obtain merged history point clouds, and then obtains the updated point clouds after global optimization.

According to the method for updating a point cloud in the above embodiment of the present disclosure, the pose of the point cloud acquisition device is used to determine the area point cloud matching the newly added point clouds, and only the area point cloud matching the newly added point cloud needs to be called to realize the splicing of the newly added point cloud.

Figure 4:
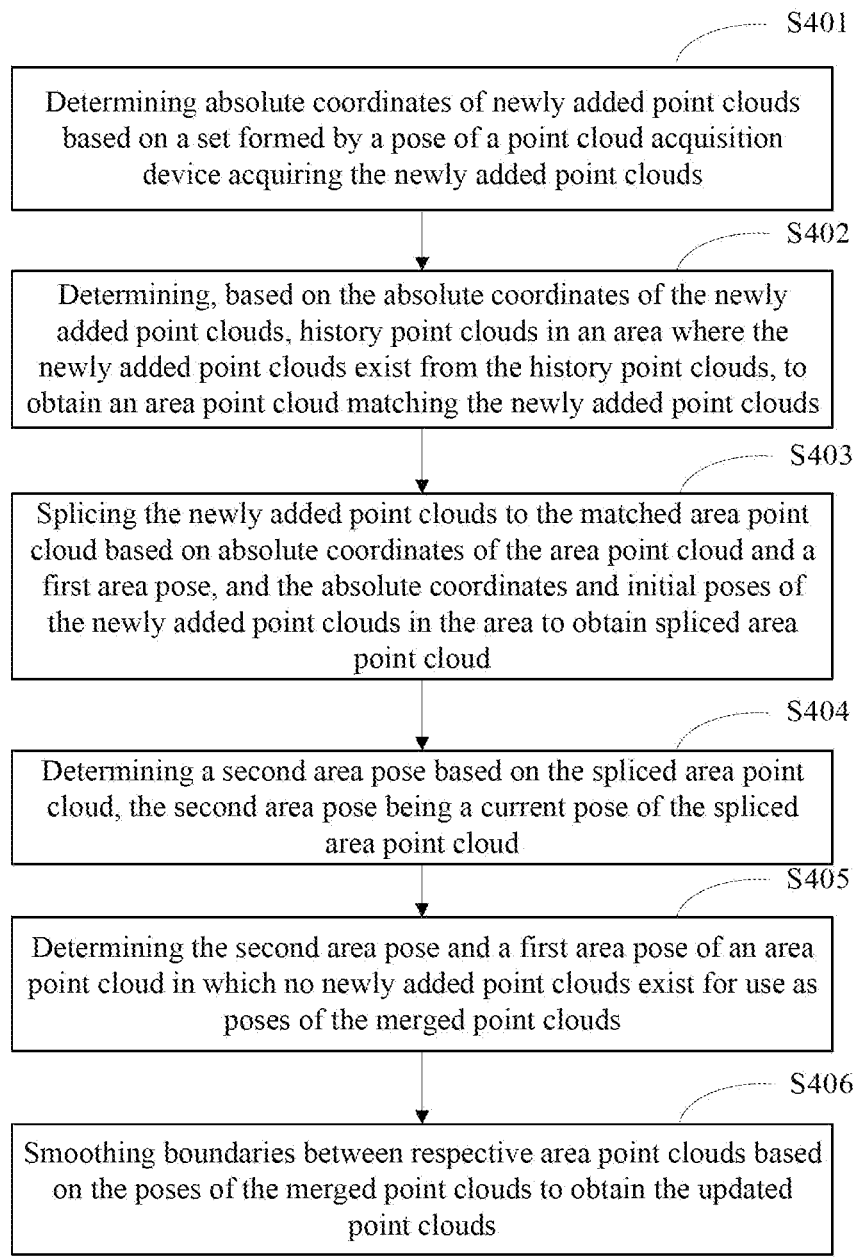
FIG. 4 is a schematic diagram according to a third embodiment of the present disclosure.

With continuing reference to FIG. 4, there is shown a flow chart of a method for updating a point cloud according to a third embodiment of the present disclosure, which includes the following steps.

Step S401: determining absolute coordinates of newly added point clouds based on a set formed by a pose of a point cloud acquisition device acquiring the newly added point clouds.

In the present embodiment, areas of historical point clouds are divided on the basis of the absolute coordinates of the point clouds, and the relevant contents have been discussed in an alternative implementation of the foregoing step S201, and repeated details are not described herein.

In the present embodiment, the point cloud image acquired by the point cloud acquisition device includes the point cloud coordinates of the newly added point clouds. The absolute coordinates of the newly added point clouds may be obtained by coordinate transformation in combination with the pose of the point cloud acquisition device.

Step S402: determining, based on the absolute coordinates of the newly added point clouds, history point clouds in an area where the newly added point clouds exist from the history point clouds, to obtain an area point cloud matching the newly added point clouds.

In the present embodiment, based on the absolute coordinates of the newly added point clouds obtained in step S401, an area to which each point in the newly added point clouds belongs in the historical point clouds may be determined, and the point clouds in the area are the area point cloud matching the newly added point clouds.

As an example, the newly added point clouds obtained by the executing body includes 20 points. Based on the absolute coordinates of the 20 points, the areas in which the 20 points are located in the historical point clouds are determined. For example, if 5 points are located in area 1 of the historical point clouds, 10 points are located in area 2 of the historical point clouds, and 5 points are located in area 3 of the historical point cloud, then the obtained area point clouds matching the newly added point clouds are point clouds in the areas 1, 2, and 3.

It can be seen that the accuracy of the area point cloud determined in the present embodiment is higher than that of the area point cloud determined according to the absolute coordinates of the acquisition device in the foregoing step S201.

Step S403: splicing the newly added point clouds to the matched area point cloud based on absolute coordinates of the area point cloud and a first area pose, and the absolute coordinates and initial poses of the newly added point clouds in the area to obtain spliced area point cloud, where the first area pose includes an initial pose of each area point cloud in the history point clouds before merging.

In the present embodiment, the absolute coordinates of the area point cloud and the first area pose, and the absolute coordinates and the initial poses of the newly added point clouds are used to construct a point pair in the splicing process of the newly added point clouds and the area point cloud, and the loss function constructed based on a plurality of groups of point pairs may be used to guide the splicing process so as to improve the accuracy of the splicing of the point clouds.

As an example, the executing body may use an ICP matching algorithm to determine, from the area point clouds and the newly added point clouds, two points with the same absolute coordinates and a difference between the first area pose of the area point cloud and the initial pose of the newly added point cloud is smaller than a preset threshold as the matching points to construct a point pair, thereby obtaining a plurality of groups of point pairs and loss functions, and then select a solution with a minimum loss function, and merge the newly added point cloud into the area point cloud to ensure higher accuracy of the obtained spliced area point cloud.

Step S404: determining a second area pose based on the spliced area point cloud, the second area pose being a current pose of the spliced area point cloud.

In this embodiment, the current pose of the spliced area point cloud is used to represent the pose obtained by optimizing the pose of each point in the area by a point cloud matching algorithm in the spliced area point cloud.

Step S405: determining the second area pose and a first area pose of an area point cloud in which no newly added point clouds exist for use as poses of the merged point clouds.

In the present embodiment, when the newly added point clouds are merged into the historical point clouds, only the newly added point clouds and the area point cloud matching the newly added point clouds are involved in the point cloud splicing operation. Therefore, the merged historical point clouds include two parts: the area point cloud obtained after splicing, and the area point cloud which is not spliced and maintains the original state. The area poses corresponding to the two area point clouds are the second area pose and the first area pose respectively.

Step S406: smoothing boundaries between respective area point clouds based on the poses of the merged point clouds to obtain the updated point clouds.

In the present embodiment, in order to further improve the efficiency of the point cloud update, a lightweight global optimization is adopted for the merged point clouds. For example, based on the poses of the merged point clouds, the executing body may perform smoothing processing on the boundaries between respective area point clouds by using the Pose Graph algorithm to eliminate the boundary error of the merged point clouds.

As can be seen from FIG. 4, the second embodiment embodies the step of finding an area point cloud from the historical point clouds based on the absolute coordinates of the newly added point clouds as compared with the first embodiment shown in FIG. 2, so that the accuracy of determining the area point cloud from the historical point clouds may be improved, thereby improving the accuracy of updating the point cloud.

Figure 5:
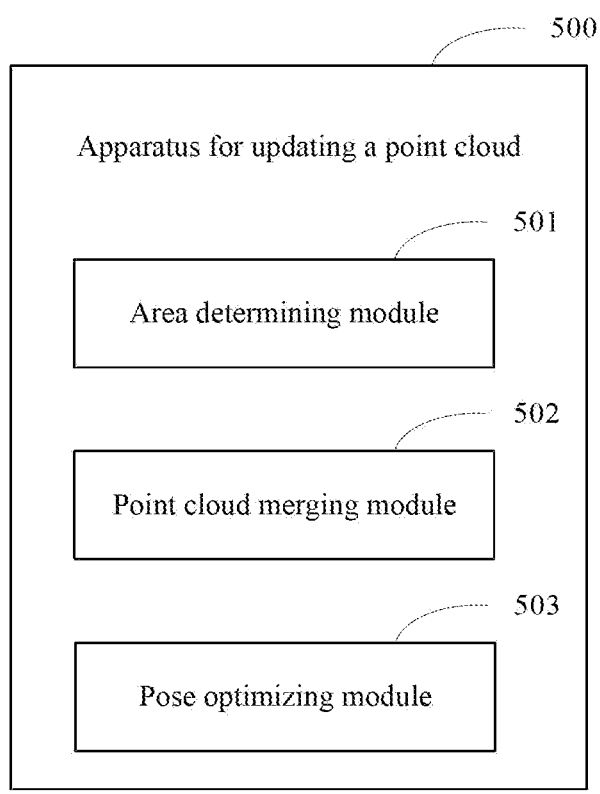
FIG. 5 is a block diagram of an electronic device for implementing a method for updating a point cloud according to an embodiment of the present disclosure.

FIG. 5 illustrates a block diagram of an electronic device for updating a point cloud corresponding to the method according to an embodiment of the disclosure. The electronic device 500 includes: an area determining module 501 configured to determine an area point cloud matching newly added point clouds from historical point clouds to be updated based on a set formed by a pose of a point cloud acquisition device acquiring the newly added point clouds; a point cloud merging module 502 configured to merge the newly added point clouds into the matched area point cloud to obtain merged historical point clouds; and a pose optimizing module 503 configured to perform global optimization on the merged historical point clouds based on a pose of each point cloud in the merged historical point clouds to obtain updated point clouds.

In the present embodiment, the apparatus further includes an area dividing module configured to divide the historical point clouds into areas corresponding to absolute coordinates of the historical point clouds based on the absolute coordinates of the historical point clouds.

In the present embodiment, the area determining module 501 is further configured to determine absolute coordinates of the newly added point clouds based on the set formed by the pose of the point cloud acquisition device acquiring the newly added point clouds; and determine historical point clouds in an area where the newly added point clouds exist from the historical point clouds based on the absolute coordinates of the newly added point clouds, to obtain the area point cloud matching the newly added point clouds.

In the present embodiment, the point cloud merging module 502 is further configured to splice the newly added point clouds to the matched area point cloud based on following parameters of the area point clouds: absolute coordinates and first area pose, and following parameters of the newly added point clouds in the area: absolute coordinates and initial poses, to obtain spliced area point cloud; wherein the first area pose comprises an initial pose of each area point cloud in the historical point clouds before the merging; and determine the merged historical point clouds based on the spliced area point cloud and area point clouds in which no newly added point clouds exist.

In the present embodiment, the pose optimizing module 503 is further configured to determine a second area pose based on the spliced area point cloud, wherein the second area pose is a current pose of the spliced area point cloud; determine the second area pose, and a first area pose of an area point cloud in which no newly added point clouds exist as poses of the merged point clouds; and smooth boundaries between respective area point clouds based on the poses of the merged point clouds to obtain the updated point clouds.

According to the method and apparatus for updating a point cloud, the device, and the storage medium provided by embodiments of the disclosure, the problems of low efficiency and long time consumption caused by large operation amount when the historical point clouds are updated in the related art are solved, the area point cloud matching the newly added point clouds is determined through the pose of the point cloud acquisition device, and splicing of the newly added point clouds can be realized by calling only the area point cloud matching the newly added point clouds without requiring all the historical point clouds to participate in operation in the splicing process, so that the operation amount when the point cloud is spliced is reduced, and the efficiency of updating the point cloud is improved.

Figure 6:
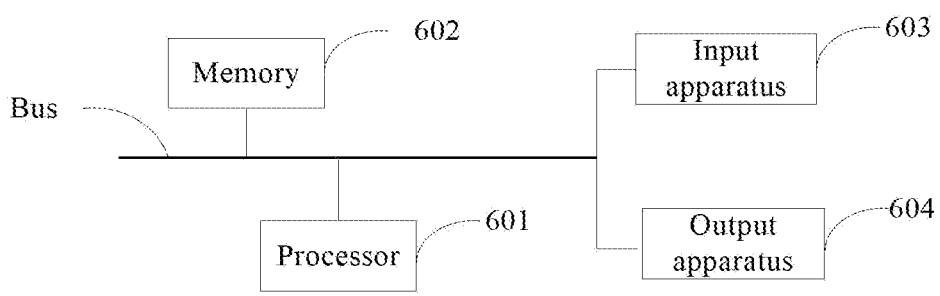
FIG. 6 is a scenario diagram of a computer-readable storage medium in which embodiments of the present disclosure may be implemented.

As shown in FIG. 6, which is a block diagram of an electronic device of a method for updating a point cloud according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processing, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 6, the electronic device includes: one or more processors 601, a memory 602, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations (for example, as a server array, a set of blade servers, or a multi-processor system). In FIG. 6, one processor 601 is used as an example.

The memory 602 is a non-transitory computer readable storage medium provided by an embodiment of the present disclosure. The memory stores instructions executable by at least one processor, so that the at least one processor performs the method for updating a point cloud provided by an embodiment of the present disclosure. The non-transitory computer readable storage medium of an embodiment of the present disclosure stores computer instructions for causing a computer to perform the method for updating a point cloud provided by the embodiment of the present disclosure.

The memory 602, as a non-transitory computer readable storage medium, may be used to store non-transitory software programs, non-transitory computer executable programs and modules, such as program instructions/modules corresponding to the method for updating a point cloud in the embodiments of the present disclosure (for example, the area determining module 501, the point cloud merging module 502, and the pose optimizing module 502 shown in FIG. 5). The processor 601 executes the non-transitory software programs, instructions, and modules stored in the memory 602 to execute various functional applications and data processing of the server, that is, to implement the method for updating a point cloud in the foregoing method embodiment.

The memory 602 may include a storage program area and a storage data area, where the storage program area may store an operating system and at least one function required application program; and the storage data area may store data created by the use of the electronic device according to the method for processing parking, etc. In addition, the memory 602 may include a high-speed random access memory, and may also include a non-transitory memory, such as at least one magnetic disk storage device, a flash memory device, or other non-transitory solid-state storage devices. In some embodiments, the memory 602 may optionally include memories remotely provided with respect to the processor 601, and these remote memories may be connected to the electronic device of the method for processing parking through a network. Examples of the above network include but are not limited to the Internet, intranet, local area network, mobile communication network, and combinations thereof.

The electronic device of the method for processing an image may further include: an input apparatus 603 and an output apparatus 604. The processor 601, the memory 602, the input apparatus 603, and the output apparatus 604 may be connected through a bus or in other methods. In FIG. 6, connection through a bus is used as an example.

The input apparatus 603 may receive input digital or character information, and generate key signal inputs related to user settings and function control of the electronic device of the method for processing parking, such as touch screen, keypad, mouse, trackpad, touchpad, pointing stick, one or more mouse buttons, trackball, joystick and other input apparatuses. The output apparatus 604 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other.

According to the technical solution of embodiments of the disclosure, the pose of the point cloud acquisition device is used for determining the area point cloud matching the newly added point clouds, and only the area point cloud matching the newly added point clouds is called, without requiring all the to historical point clouds to participate in the operation, to realize the splicing of the newly added point clouds, so that the calculation amount during the splicing of the point clouds is effectively reduced, and the efficiency of updating the point cloud is improved.

It should be understood that the steps of reordering, adding or deleting may be performed using the various forms shown above. For example, the steps described in the present disclosure may be performed in parallel or sequentially or in a different order, so long as the desired results of the technical solution disclosed in the present disclosure may be realized, and no limitation is imposed herein.

The foregoing detailed description is not intended to limit the scope of the present disclosure. It will be appreciated by those skilled in the art that various modifications, combinations, sub-combinations, and substitutions may be made depending on design requirements and other factors. Any modifications, equivalents, and modifications that fall within the spirit and principles of the present disclosure are intended to be included within the scope of the present disclosure.

What is claimed is:

1. A method for updating a point cloud, comprising:
   determining matched area point clouds that match newly acquired point clouds from historical point clouds to be updated based on a pose set composed of poses of a point cloud acquisition device acquiring the newly acquired point clouds, wherein a pose of the point cloud acquisition device refers to absolute coordinates of the point cloud acquisition device and a posture of the point cloud acquisition device when the newly acquired point clouds are acquired;
   merging the newly acquired point clouds into the matched area point clouds to obtain merged historical point clouds; and
   performing a global optimization on the merged historical point clouds based on a pose of each point cloud in the merged historical point clouds to obtain updated point clouds, wherein the global optimization is performed by using a Bundle Adjustment (BA) algorithm to eliminate a boundary error,
   wherein the matched area point clouds in the historical point clouds is obtained by dividing, based on the absolute coordinates of the historical point clouds, the historical point clouds into multiple parts, wherein each part corresponds to an area associated with the absolute coordinates of the historical point clouds,
   wherein determining the matched area point clouds that match the newly acquired point clouds from the historical point clouds to be updated based on the pose set composed of poses of the point cloud acquisition device acquiring the newly acquired point clouds comprises:
      determining absolute coordinates of each of the newly acquired point clouds based on the pose set composed of poses of the point cloud acquisition device acquiring the newly acquired point clouds; and
      determining the historical point clouds in an area where the newly acquired point clouds exist from the historical point clouds based on the absolute coordinates of the newly acquired point clouds, to obtain the matched area point cloud that matches the newly acquired point clouds, and
   wherein merging the newly acquired point clouds into the matched area point clouds to obtain the merged historical point clouds comprises:
      splicing the newly acquired point clouds to the matched area point clouds based on (1) absolute coordinates and a first area pose of the matched area point clouds and (2) the absolute coordinates and initial poses of the newly acquired point clouds in the area to obtain spliced area point cloud, wherein the first area pose comprises an initial pose of each area point cloud in the historical point clouds before the merging; and
      determining the merged historical point clouds based on the spliced area point clouds and area point clouds in which no newly acquired point clouds exist.

2. The method of claim 1, wherein performing the global optimization on the merged historical point clouds based on the pose of each point cloud in the merged historical point clouds to obtain the updated point clouds, comprises:
   determining a second area pose based on the spliced area point cloud, wherein the second area pose is a current pose of the spliced area point cloud;
   determining the second area pose, and the first area pose of an area point cloud in which no newly acquired point clouds exist as poses of the merged historical point clouds; and
   smoothing boundaries between respective area point clouds based on the poses of the merged historical point clouds to obtain the updated point clouds.

3. An electronic device, comprising:
   at least one processor; and
   a memory communicatively connected with the at least one processor;
   wherein the memory stores instructions executable by the at least one processor, the instructions, when executed by the at least one processor, cause the at least one processor to:
      determine matched area point clouds that match newly acquired point clouds from historical point clouds to be updated based on a pose set composed of poses of a point cloud acquisition device acquiring the newly acquired point clouds, wherein a pose of the point cloud acquisition device refers to absolute coordinates of the point cloud acquisition device and a posture of the point cloud acquisition device when the newly acquired point clouds are acquired;
      merge the newly acquired point clouds into the matched area point cloud to obtain merged historical point clouds; and
      perform a global optimization on the merged historical point clouds based on a pose of each point cloud in the merged historical point clouds to obtain updated point clouds, wherein the global optimization is performed by using a Bundle Adjustment (BA) algorithm to eliminate a boundary error,
      wherein the matched area point cloud in the historical point clouds is obtained by dividing, based on the absolute coordinates of the historical point clouds, the historical point clouds into multiple parts, wherein each part corresponds to an area associated with the absolute coordinates of the historical point clouds,
      wherein the at least one processor determines the matched area point clouds that match the newly acquired point clouds from the historical point clouds to be updated based on the pose set composed of poses of the point cloud acquisition device acquiring the newly acquired point clouds by:
         determining absolute coordinates of each of the newly acquired point clouds based on the pose set composed of poses of the point cloud acquisition device acquiring the newly acquired point clouds; and
         determining the historical point clouds in an area where the newly acquired point clouds exist from the historical point clouds based on the absolute coordinates of the newly acquired point clouds, to obtain the matched area point cloud that matches the newly acquired point clouds, and wherein the at least one processor merges the newly acquired point clouds into the matched area point clouds to obtain the merged historical point clouds by:

splicing the newly acquired point clouds to the matched area point clouds based on (1) absolute coordinates and a first area pose of the matched area point clouds and (2) the absolute coordinates and initial poses of the newly acquired point clouds in the area to obtain spliced area point cloud, wherein the first area pose comprises an initial pose of each area point cloud in the historical point clouds before the merging; and determining the merged historical point clouds based on the spliced area point clouds and area point clouds in which no newly acquired point clouds exist.

4. The electronic device of claim 3, wherein the at least one processor performs the global optimization on the merged historical point clouds based on the pose of each point cloud in the merged historical point clouds to obtain the updated point clouds, by:

determining a second area pose based on the spliced area point cloud, wherein the second area pose is a current pose of the spliced area point cloud;

determining the second area pose, and the first area pose of an area point cloud in which no newly acquired point clouds exist as poses of the merged historical point clouds; and smoothing boundaries between respective area point clouds based on the poses of the merged historical point clouds to obtain the updated point clouds.

5. A non-transitory computer-readable storage medium storing computer instructions, wherein the computer instructions are used to cause a computer to perform operations, the operations comprising:

determining matched area point clouds that match newly acquired point clouds from historical point clouds to be updated based on a pose set composed of poses of a point cloud acquisition device acquiring the newly acquired point clouds, wherein a pose of the point cloud acquisition device refers to absolute coordinates of the point cloud acquisition device and a posture of the point cloud acquisition device when the newly acquired point clouds are acquired;

merging the newly acquired point clouds into the matched area point clouds to obtain merged historical point clouds; and performing a global optimization on the merged historical point clouds based on a pose of each point cloud in the merged historical point clouds to obtain updated point clouds, wherein the global optimization is performed by using a Bundle Adjustment (BA) algorithm to eliminate a boundary error, wherein the matched area point cloud in the historical point clouds is obtained by dividing, based on (1) the absolute coordinates of the historical point clouds and (2) the historical point clouds into multiple parts, wherein each part corresponds to an area associated with the absolute coordinates of the historical point clouds;

wherein determining the matched area point clouds that match the newly acquired point clouds from the historical point clouds to be updated based on the pose set composed of poses of the point cloud acquisition device acquiring the newly acquired point clouds comprises:

determining absolute coordinates of each of the newly acquired point clouds based on the pose set composed of poses of the point cloud acquisition device acquiring the newly acquired point clouds; and determining the historical point clouds in an area where the newly acquired point clouds exist from the historical point clouds based on the absolute coordinates of the newly acquired point clouds, to obtain the matched area point cloud that matches the newly acquired point clouds; and wherein merging the newly acquired point clouds into the matched area point clouds to obtain the merged historical point clouds, comprises:

splicing the newly acquired point clouds to the matched area point clouds based on (1) absolute coordinates and a first area pose of the matched area point clouds and (2) the absolute coordinates and initial poses of the newly acquired point clouds in the area to obtain spliced area point cloud, wherein the first area pose comprises an initial pose of each area point cloud in the historical point clouds before the merging; and determining the merged historical point clouds based on the spliced area point clouds and area point clouds in which no newly acquired point clouds exist.

6. The non-transitory computer-readable storage medium of claim 5, wherein performing the global optimization on the merged historical point clouds based on the pose of each point cloud in the merged historical point clouds to obtain the updated point clouds, comprises:

determining a second area pose based on the spliced area point cloud, wherein the second area pose is a current pose of the spliced area point cloud;

determining the second area pose, and the first area pose of an area point cloud in which no newly acquired point clouds exist as poses of the merged historical point clouds; and smoothing boundaries between respective area point clouds based on the poses of the merged historical point clouds to obtain the updated point clouds.

* * * * *